US012782974B2

(12) United States Patent
DiFurio et al.

(10) Patent No.: US 12,782,974 B2
(45) Date of Patent: Nov. 3, 2026

(54) METHOD FOR ABSTRACTING INTEGRATIONS BETWEEN INDUSTRIAL CONTROLS AND MOBILE ROBOTS

(71) Applicant: Seegrid Corporation, Pittsburgh, PA (US)

(72) Inventors: Andrew DiFurio, Pittsburgh, PA (US); Stephen Ramusivich, McMurray, PA (US); Ryan Schwiebert, Pittsburgh, PA (US); Krutarth Shah, Medford, MA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 327 days.

(21) Appl. No.: 18/529,229

(22) Filed: Dec. 5, 2023

(65) Prior Publication Data

US 2024/0184312 A1 Jun. 6, 2024

Related U.S. Application Data

(60) Provisional application No. 63/430,200, filed on Dec. 5, 2022.

(51) Int. Cl.
*G05D 1/692* (2024.01)
*G05B 19/05* (2006.01)
(Continued)

(52) U.S. Cl.
CPC ........... *G05D 1/692* (2024.01); *G05B 19/052* (2013.01); *G05D 1/2295* (2024.01); *G05B 2219/15116* (2013.01); *G05D 2107/70* (2024.01)

(58) Field of Classification Search
CPC .. G05D 1/692; G05D 1/2295; G05D 2107/70; G05D 2105/28; G05D 2109/10;
(Continued)

(56) References Cited

U.S. PATENT DOCUMENTS

2004/0068433 A1 4/2004 Chatterjee et al.
2007/0293978 A1* 12/2007 Wurman ............ G05B 19/4189 700/213

(Continued)

FOREIGN PATENT DOCUMENTS

EP 3715994 B1 * 9/2022 ............. G06V 20/10
EP 4650901 A1 * 11/2025 ........... G05D 1/2464
JP 2022177375 A * 12/2022 ............. G08G 1/005

OTHER PUBLICATIONS

JP-2022177375-A translation (Year: 2022).*

(Continued)

*Primary Examiner* — Kyle T Johnson

(74) *Attorney, Agent, or Firm* — Onello & Mello PC

(57) ABSTRACT

A system and method are provided that monitor and control, in real time, access to a plurality of resource entities usable by robotic vehicles during workflow. The system can comprise a plurality of industrial controllers each coupled to at least one presence detector configured to detect a state of availability of an entity from a plurality of entities. The system can further comprise management system configured to register a state of availability of each entity in an environment and to selectively grant temporary, exclusive access of an entity to an autonomous mobile robot (AMR) based on the state of availability of the entity. If the state indicates an entity is unoccupied access can be granted, else access is denied. Each controller is registered in the management system in association with at least one uniquely identified entity.

21 Claims, 6 Drawing Sheets

(51) Int. Cl.
*G05D 1/229* (2024.01)
*G05D 107/70* (2024.01)

(58) Field of Classification Search
CPC .... G05D 1/693; G05D 1/6987; G05B 19/052; G05B 2219/15116
See application file for complete search history.

(56) References Cited

U.S. PATENT DOCUMENTS

2008/0288104 A1* 11/2008 Shani ...................... E04H 6/422 700/214
2014/0214234 A1* 7/2014 Worsley ............ G05B 19/4189 701/2
2015/0134317 A1* 5/2015 Maturana ............... G05B 17/02 703/13
2016/0266578 A1* 9/2016 Douglas ............... G05D 1/0022
2019/0033882 A1* 1/2019 Collett ................... G08G 1/162
2019/0236948 A1* 8/2019 Wang ............... G08G 1/096725
2019/0308863 A1* 10/2019 Alexander ................ B66F 9/12
2021/0339396 A1* 11/2021 Denenberg ............. B25J 9/1697
2022/0197306 A1* 6/2022 Cella ................ G06Q 10/06311
2024/0142985 A1* 5/2024 Wise .................... G05D 1/0238
2024/0150159 A1* 5/2024 Melchior ................ B66F 9/063
2024/0152148 A1* 5/2024 Hoskinson ........... G05D 1/6987
2024/0184312 A1* 6/2024 DiFurio ............... G05B 19/052
2024/0231381 A1* 7/2024 Yamada ................. G08G 1/166
2025/0059010 A1* 2/2025 Rhoads .................. B25J 9/1687
2025/0068180 A1* 2/2025 Takashima ............. G05D 1/644
2025/0068185 A1* 2/2025 Takashima ............. G05D 1/693

OTHER PUBLICATIONS

International Search Report and Written Opinion dated Mar. 13, 2024 issued in International Application No. PCT/US2023/082453.
Extended European Search Report dated May 13, 2026 issued in European Application No. 23901432.7.

* cited by examiner

METHOD FOR ABSTRACTING INTEGRATIONS BETWEEN INDUSTRIAL CONTROLS AND MOBILE ROBOTS

CROSS REFERENCE TO RELATED APPLICATIONS

The present application claims priority to U.S. Provisional Appl. 63/430,200, filed on Dec. 5, 2022, entitled Method for Abstracting Integrations Between Industrial Controls and AMRS, the contents of which are incorporated herein by reference.

The present application may be related to International Application No. PCT/US23/016556 filed on Mar. 28, 2023, entitled A Hybrid, Context-Aware Localization System For Ground Vehicles; International Application No. PCT/US23/016565 filed on Mar. 28, 2023, entitled Safety Field Switching Based On End Effector Conditions In Vehicles; International Application No. PCT/US23/016608 filed on Mar. 28, 2023, entitled Dense Data Registration From An Actuatable Vehicle-Mounted Sensor; International Application No. PCT/US23,016589, filed on Mar. 28, 2023, entitled Extrinsic Calibration Of A Vehicle-Mounted Sensor Using Natural Vehicle Features; International Application No. PCT/US23/016615, filed on Mar. 28, 2023, entitled Continuous And Discrete Estimation Of Payload Engagement/Disengagement Sensing; International Application No. PCT/US23/016617, filed on Mar. 28, 2023, entitled Passively Actuated Sensor System; International Application No. PCT/US23/016643, filed on Mar. 28, 2023, entitled Automated Identification Of Potential Obstructions In A Targeted Drop Zone; International Application No. PCT/US23/016641, filed on Mar. 28, 2023, entitled Localization of Horizontal Infrastructure Using Point Clouds; International Application No. PCT/US23/016591, filed on Mar. 28, 2023, entitled Robotic Vehicle Navigation With Dynamic Path Adjusting; International Application No. PCT/US23/016612, filed on Mar. 28, 2023, entitled Segmentation of Detected Objects Into Obstructions and Allowed Objects; International Application No. PCT/US23/016554, filed on Mar. 28, 2023, entitled Validating the Pose of a Robotic Vehicle That Allows It To Interact With An Object On Fixed Infrastructure; and International Application No. PCT/US23/016551, filed on Mar. 28, 2023, entitled A System for AMRs That Leverages Priors When Localizing and Manipulating Industrial Infrastructure; International Application No.: PCT/US23/024114, filed on Jun. 1, 2023, entitled System and Method for Generating Complex Runtime Path Networks from Incomplete Demonstration of Trained Activities; International Application No.: PCT/US23/023699, filed on May 26, 2023, entitled System and Method for Performing Interactions with Physical Objects Based on Fusion of Multiple Sensors; International Application No.: PCT/US23/024411, filed on Jun. 5, 2023, entitled Lane Grid Setup for Autonomous Mobile Robots (AMRs); International Application No.: PCT/US23/033818, filed on Sep. 27, 2023, entitled Shared Resource Management System and Method; International Application No.: PCT/US23/079141, filed on Nov. 8, 2023, entitled System And Method For Definition Of A Zone Of Dynamic Behavior With A Continuum Of Possible Actins and Locations Within Same; International Application No.: PCT/US23/078890, filed on Nov. 7, 2023, entitled Method And System For Calibrating A Light-Curtain; International Application No.: PCT/US23/036650, filed on Nov. 2, 2023, entitled System and Method for Optimized Traffic Flow Through Intersections with Conditional Convoying Based on Path Network Analysis; U.S. Provisional Appl. 63/430,184 filed on Dec. 5, 2022, entitled Just in Time Destination Definition and Route Planning; U.S. Provisional Appl. 63/430,182 filed on Dec. 5, 2022, entitled Composable Patterns of Material Flow Logic for the Automation of Movement; U.S. Provisional Appl. 63/430,174 filed on Dec. 5, 2022, entitled Process Centric User Configurable Step Framework for Composing Material Flow Automation; U.S. Provisional Appl. 63/430,195 filed on Dec. 5, 2022, entitled Generation of "Plain Language" Descriptions Summary of Automation Logic; U.S. Provisional Appl. 63/430,171 filed on Dec. 5, 2022, entitled Hybrid Autonomous System Enabling and Tracking Human Integration into Automated Material Flow; U.S. Provisional Appl. 63/430,180 filed on Dec. 5, 2022, entitled A System for Process Flow Templating and Duplication of Tasks Within Material Flow Automation; U.S. Provisional Appl. 63/430,190 filed on Dec. 5, 2022, entitled Configuring a System That Handles Uncertainty with Human and Logic Collaboration in A Material Flow Automation Solution; and U.S. Provisional Appl. 63/430,170 filed on Dec. 5, 2022, entitled Visualization of Physical Space Robot Queuing Areas as Non Work Locations for Robotic Operations, each of which is incorporated herein by reference in its entirety.

The present application may be related to U.S. patent application Ser. No. 11/350,195, filed on Feb. 8, 2006, U.S. Pat. No. 7,466,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S. Pat. No. 8,864,164, Issued on Oct. 21, 2014, entitled Tugger Attachment; U.S. Design patent application Ser. No. 29/398,127, filed on Jul. 26, 2011, U.S. Pat. No. D680,142, Issued on Apr. 16, 2013, entitled Multi-Camera Head; U.S. Design patent application Ser. No. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 17/712,660, filed on Apr. 4, 2022, US Publication Number 2022/0297734, Published on Sep. 22, 2022, entitled Laterally Operating Payload Handling Device; U.S. patent application Ser. No. 16/892,549, filed on Jun. 4, 2020, U.S. Pat. No. 11,693,403, Issued on Jul. 4, 2023, entitled Dynamic Allocation And Coordination of Auto-Navigating Vehicles and Selectors; U.S. patent application Ser. No. 18/199,052, filed on May 18, 2023, Publication Number 2023/0376030, Published on Nov. 23, 2023, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022/0100195, Published on Mar. 31, 2022, entitled Vehicle Object-Engagement Scanning System And Method; U.S. patent application Ser. No. 17/478,338, filed on Sep. 17, 2021, US Publication Number 2022/0088980, Published on Mar. 24, 2022, entitled Mechanically-Adaptable Hitch Guide; U.S. patent application 29/832,212, filed on Mar. 25, 2022, entitled Mobile Robot, each of which is incorporated herein by reference in its entirety.

FIELD OF INTEREST

The present inventive concepts relate to the field of robotics and autonomous mobile robots (AMRs). In particular, the inventive concepts may be related to systems and methods in the field of providing a state of a facility and/or locations within the facility via industrial controllers to mobile robots.

BACKGROUND

Within increasing numbers and types of environments autonomous vehicles may travel through areas and/or along pathways that are shared with other vehicles and/or pedestrians. Such other vehicles can include other autonomous vehicles, semi-autonomous vehicles, and/or manually operated vehicles. The autonomous vehicles can take a variety of forms and can be referred to using various terms, such as mobile robots, robotic vehicles, automated guided vehicles, and/or autonomous mobile robots (AMRs). In some cases, these vehicles can be configured for operation in an autonomous mode where they self-navigate or in a manual mode where a human directs the vehicle's navigation. Herein, vehicles that are configured for autonomous navigation are referred to as AMRs.

Multiple AMRs may have access to an environment and both the state of the environment and the state of AMRs are constantly changing. The environment can be within, for example, a warehouse or large storage space or facility and the AMRs can include, but are not limited to, pallet lifts, pallet trucks, and tuggers.

Industrial AMRs need to use industrial controllers, that is, programmable logic controllers (PLCs), to achieve a higher level of automation. In order to fully leverage PLCs in industrial automation, they need to be integrated with fleet management software, wherein a fleet management system can be provided in an environment to manage and monitor various mobile robots operating therein. When enabling the integration, the integration can be done directly and specifically, or more generally. To enable more industrial automation use cases, a generalized approach is required to abstract integration between industrial controllers and AMRs.

A problem exists as to how to manage an AMR or AMRs in a changing facility. Specifically, the problem exists as to how to centrally maintain exclusive "ownership" of an entity across numerous AMRs using industrial controllers and how to convey information about the state of a facility or locations within the facility to the AMRs via industrial controllers, as both the state of a facility or locations within the facility and the state of an AMR are constantly changing. As used here in, "ownership" can mean control or right to use of an entity or asset.

Previously, a client acting as a "Supervisor" had a PLC integration that would work by polling the PLCs for their state on some regular interval. It would then use the values of the PLCs at the time they were read and evaluate a rule set to see if any were triggered and store the state of the PLC for potential later use. Triggers can take a variety of forms, including, as an example, user input at the AMR. While the server stored the state of the PLCs, it would not maintain exclusive ownership of things. Based on the rule sets, AMRs were able to do things based on the state of a PLC, but the AMRs were not granted exclusive ownership of something, such as a physical location. This lack of exclusive ownership meant that it was difficult for two different parts of the system to agree on ownership of an entity (e.g., a physical location). That is, if exclusive ownership of a specific location is not known, it will not be known which AMR has access to the specific location.

SUMMARY

In accordance with various aspects of the inventive concepts, provided is a system, comprising: a plurality of industrial controllers each coupled to at least one presence detector configured to detect a state of availability of an entity from a plurality of entities; and a management system configured to register a state of availability of each entity in an environment and to selectively grant temporary, exclusive access of an entity to an autonomous mobile robot (AMR) based on the state of availability of the entity.

In various embodiments, an industrial controller is configured to communicate a state of availability of monitored entity to the management system in response to a change in state of the monitored entity.

In various embodiments, the entity comprises a space, a location, equipment, and/or a resource.

In various embodiments, the management system is further configured to deny access by other AMRs to the entity, when an industrial controller registered in association with the entity communicates to the management system that the entity is occupied.

In various embodiments, when the AMR completes use of the entity, an industrial controller registered in association with the entity is configured to send a change of state message to the management system indicating that the entity is unoccupied and the management system releases the temporary, exclusive access of the AMR.

In various embodiments, the system further comprises a plurality of industrial controllers and a plurality of entities, each industrial controller in communication with at least one detector configured to monitor at least one uniquely identified entity.

In various embodiments, an industrial controller is in communication with a plurality of detectors configured to monitor a plurality of uniquely identified entities and the industrial controller is configured to register a state of each uniquely identified entity individually.

In various embodiments, the plurality of industrial controllers coupled to and/or in communication with the at least one presence detector is configured to detect and register the state of availability of the at least one entity in real time.

In various embodiments, the plurality of industrial controllers includes a plurality of program logic controllers (PLCs).

In various embodiments, the industrial controllers include program logic controllers (PLCs), the entities include locations, the environment is a warehouse, the AMRs include material transport AMRs, and the management system includes access control functionality in communication with the PLCs, and fleet management functionality in communication with the AMRs.

In accordance with various aspects of the inventive concepts, provided is a method, comprising: using a plurality of industrial controllers each coupled to at least one presence detector, detecting a state of availability of an entity from a plurality of entities; and registering a state of availability of each entity of an environment in a management system and selectively granting temporary, exclusive access of an entity to an autonomous mobile robot (AMR) based on the state of availability of the entity.

In various embodiments, the method further comprises the industrial controller communicating a state of availability of monitored entity to the management system in response to a change in state of the monitored entity.

In various embodiments, the entity comprises a space, a location, equipment, and/or a resource.

In various embodiments, the method further comprises the management system denying access by other AMRs to the entity, when an industrial controller registered in association with the entity communicates to the management system that the entity is occupied.

In various embodiments, the method further comprises, when the AMR completes use of the entity, an industrial controller registered in association with the entity sending a change of state message to the management system indicating that the entity is unoccupied and the management system releasing the temporary, exclusive access of the AMR.

In various embodiments, the method further comprises a plurality of industrial controllers and a plurality of entities, each industrial controller in communication with at least one detector monitoring at least one uniquely identified entity.

In various embodiments, the method further comprises an industrial controller in communication with a plurality of detectors monitoring a plurality of uniquely identified entities and the industrial controller registering a state of each uniquely identified entity individually.

In various embodiments, the method further comprises the plurality of industrial controllers coupled to and/or in communication with the at least one presence detector detecting and registering the state of availability of the at least one entity in real time.

In various embodiments, the plurality of industrial controllers includes a plurality of program logic controllers (PLCs).

In various embodiments, the industrial controllers include program logic controllers (PLCs), the entities include locations, the environment is a warehouse, the AMRs include material transport AMRs, and the management system includes access control functionality in communication with the PLC, and fleet management functionality in communication with the AMRs.

In accordance with various aspects of the inventive concepts, provided is a system comprising for each of a plurality of entities within an environment, an industrial controller in combination with at least one presence detector configured to determine a state of availability of an entity and to communicate the state of availability of the entity to a management system; and the management system is configured to register the state of each entity and to selectively grant or deny temporary, exclusive access of a requested entity to an autonomous mobile robot (AMR) based on a state of the requested entity.

In various embodiments, the environment is a warehouse environment and the plurality of entities includes a location, a space, equipment, or other resource usable and requestable by the plurality of AMRs to perform a task.

In various embodiments, at least one industrial controller is coupled to only one presence detector.

In various embodiments, at least one industrial controller is coupled to a plurality of presence detectors.

In various embodiments, each industrial controller is configured to send a change of state message to the management system in real-time in response to an AMR commencing user or completing use of an entity.

In accordance with various aspects of the inventive concepts, provided is a method comprising for each of a plurality of entities within an environment, an industrial controller in combination with at least one presence detector determining a state of availability of an entity and communicating the state of availability of the entity to a management system; and the management system registering the state of each entity and selectively granting or denying temporary, exclusive access of a requested entity to an autonomous mobile robot (AMR) based on a state of the requested entity.

In various embodiments, wherein the environment is a warehouse environment and the plurality of entities includes a location, a space, equipment, or other resource usable and requestable by the plurality of AMRs to perform a task.

In various embodiments, at least one industrial controller is coupled to only one presence detector.

In various embodiments, at least one industrial controller is coupled to a plurality of presence detectors.

In various embodiments, the method further comprises each industrial controller sending a change of state message to the management system in real-time in response to an AMR commencing user or completing use of an entity.

BRIEF DESCRIPTION OF THE DRAWINGS

The present inventive concepts will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
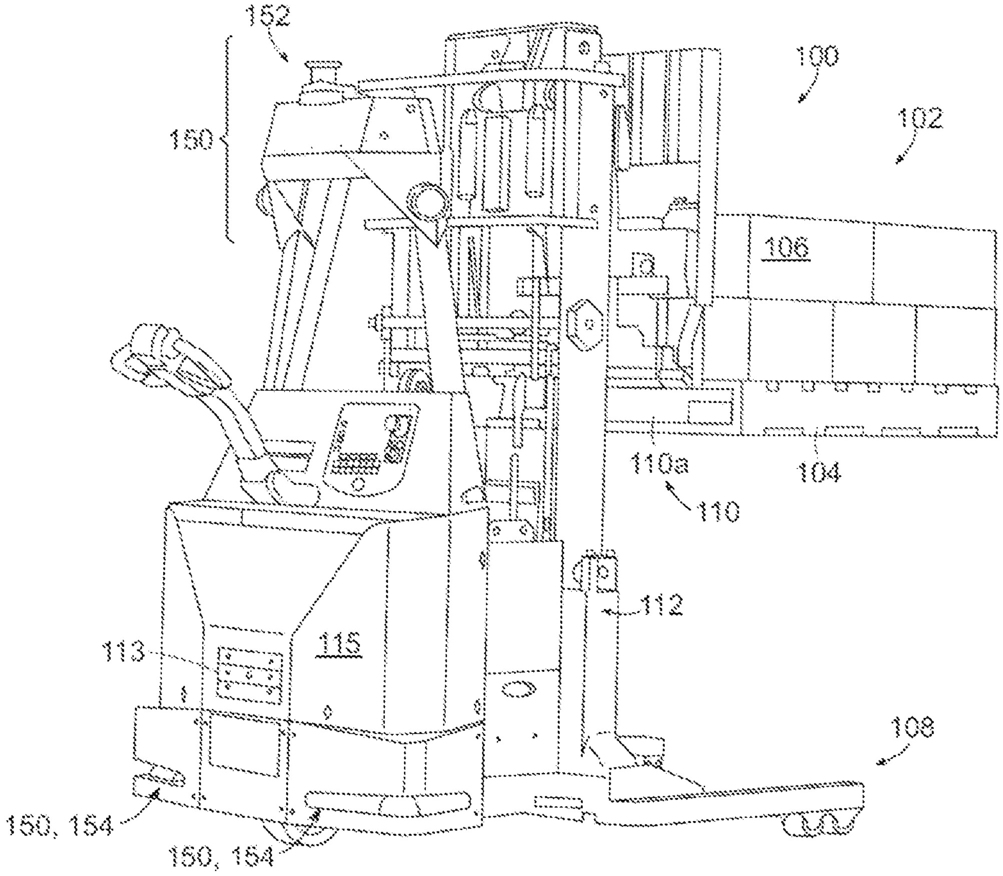
FIG. 1 is a perspective view of an embodiment of an AMR forklift that comprises an embodiment of the systems described herein, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with aspect of the inventive concepts, a system and method are provided for monitoring and managing a state of entities within an environment, e.g., a facility, via industrial controllers in communication with fleet management functionality serving the environment. In various embodiments, the entities are physical entities utilized robotic vehicle as part of a workflow comprising one or more AMR tasks. In various embodiments, the entities include physical locations or spaces, apparatuses, equipment, and/or other resources useful or necessary by the AMR in performing workflow tasks.

In various embodiments, the industrial controllers take the form of or include programmable logic controllers (PLCs) coupled to or including one or more detectors or sensors that monitor availability of the entity. In various embodiments, the robotic vehicles take the form of or include autonomous mobile robots (AMRs).

In accordance with aspects of the inventive concepts, in various embodiments, a system and a method are provided that abstract integrations between PLCs and AMRs. In various embodiments, the system and the method comprise an access control system comprising PLCs coupled to detectors in communication with fleet management functionality of a supervisor system that selectively grants access to entities requested by AMRs operating in an environment. The access control system can form part of a fleet management system (FMS), which can take the form of or be part of a supervisor system.

In various embodiments, each of the predetermined entities can be monitored by a presence detector or sensor that is logically coupled to at least one PLC. In turn, each PLC can be coupled to or otherwise in communication with the supervisor can communicate a signal indicating availability information for the entity. When the entity is a location, the indication can be related to occupancy. The supervisor can be in communication with the AMRs to assign AMRs to entities, e.g., locations, based on the state of availability indicated by the PLC. In various embodiments, the supervisor can maintain a register of the physical locations and maintain their states as available or unavailable. A location is a type of physical entity represented within an environment; the entity can include locations or spaces, equipment, drop and/or pick areas or structures, e.g., tables or shelving, or other physical assets that could be used and/or navigated by an AMR. The status of these entities can be dynamically changing in real time within the context of a busy environment with multiple AMRs, other systems, and humans simultaneously performing tasks. Workflow can be made more efficient by having the supervisor perform real-time tracking of states of a plurality of entities, e.g., locations, throughout a facility that will be needed by different robotic vehicles performing workflow tasks simultaneously.

In various embodiments, to enable a generalized solution between industrial controls and AMRs, the access control functionality exposes a Modbus server, which is a data communications protocol. The Modbus server is used to facilitate communication between PLCs and the access control functionality of the supervisor. This is a departure from the existing methods, where the supervisor is only periodically polling PLCs for their states. When a PLC writes a Modbus message to the supervisor, the Boolean or byte value written to the supervisor is abstracted to a generalized state of the facility, which is later used to accomplish meaningful work. The shift from periodic polling to real-time monitoring involves processing and data storage that can quickly interpret PLC state information across a plurality of systems and communicate availability of lack of availability to AMRs in real time.

The generalized state of the environment, e.g., a facility, is used in two ways: to start work to be performed and to save the information to be used to complete work later. When performing work, AMRs need exclusive access to physical locations. In some embodiments, the system and/or method comprises abstracting the exclusive use of multiple physical locations among multiple AMRs by providing an interface to request exclusive ownership of some locations among a set of preconfigured candidate locations. The state of the preconfigured candidate locations is not known until runtime and must be continually monitored and managed.

The system and/or method comprises functionality that allows industrial controllers (e.g., PLCs) to maintain exclusive access to a path intersection, as an example of a location, in order to limit the number of AMRs in that path segment to only one AMR at a time. The generalized nature of the access control functionality allows multiple heterogeneous AMR makers and heterogeneous AMR body types to safely co-exist in the same facility.

FIG. 1 is a perspective view of an embodiment of a robotic vehicle in the form of an AMR forklift 100 that can request access to an entity as described herein, in accordance with aspects of the inventive concepts.

In this embodiment, AMR 100 includes a payload area 102 configured to transport a pallet 104 loaded with goods 106, as a palletized load. To engage and carry pallet 104, the AMR may include a pair of forks 110, including a first and second fork 110*a*, *b* (not shown). Outriggers 108 extend from the robotic vehicle in the direction of the forks to stabilize the vehicle, particularly when carrying palletized load 106. AMR 100 can comprise a battery area 112 for holding one or more batteries. In various embodiments, the one or more batteries can be configured for charging via a charging interface 113. AMR 100 can also include a main housing 115 within which various control elements and subsystems can be disposed, including those that enable the robotic vehicle to navigate from place to place.

Forks 110 extend from the AMR in a first direction. The AMR is configured to travel in the first direction and, alternatively, in a second direction. The second direction can be considered opposite to the first direction, understanding that the AMRs have turning capability in both directions.

The AMR 100 may include a plurality of sensors 150 that provide various forms of sensor data that enable the robotic vehicle to safely navigate throughout an environment, engage with objects to be transported, and avoid obstructions. In various embodiments, the sensor data from one or more of the sensors 150 can be used for path adaptation, including avoidance of detected objects, obstructions, hazards, humans, other robotic vehicles, and/or congestion during navigation. The sensors 150 can include one or more cameras, stereo cameras 152, radars, and/or laser imaging, detection, and ranging (LiDAR) scanners 154. One or more of the sensors 150 can form part of a 2D or 3D high-resolution imaging system.

In various embodiments, a user interface can be provided to input route planning information or other task planning information, such as job definition using job templates. A user interface (UI) 111 can be provided on the AMR or on a computer that communicates with the AMR, such as a laptop, tablet, phablet, desktop, mobile phone, or other such computer device having a user interface. A "wizard" may be generated at or within the UI to assist a user in inputting information necessary for task and/or route planning, e.g., the wizard user interface can present computer displays that guide a user through entering task and route information.

AMR 100 can be configured with the sensing, processing, and memory devices and subsystems necessary and/or useful for executing job templates to perform tasks, in accordance with aspects of the inventive concepts. AMR 100 takes the form of an AMR pallet lift, but the inventive concepts could be embodied in any of a variety of other types of robotic vehicles and AMRs, including, but not limited to, pallet trucks, tuggers, and the like. In other embodiments, the inventive concepts could be applied in other context with robotic vehicle that perform other tasks.

Figure 2:
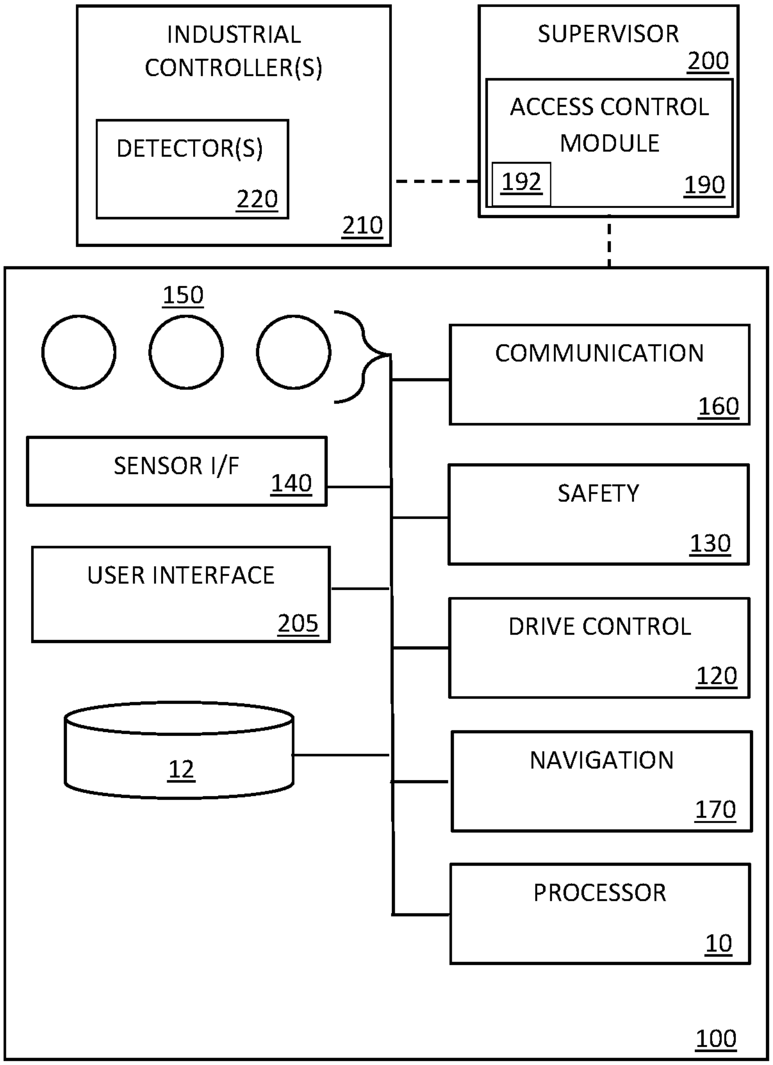
FIG. 2 is a block diagram of the AMR of FIG. 1, in accordance with aspects of inventive concepts.

FIG. 2 is a block diagram of components of an embodiment of AMR 100 of FIG. 1, which is configured to request access to locations. incorporating entity access technology in accordance with principles of inventive concepts. The embodiment of FIG. 2 is an example; other embodiments of AMR 100 can include other components and/or terminology. In the example embodiment shown in FIGS. 1 and 2, AMR 100 is a warehouse robotic vehicle, which can interface and exchange information with one or more external systems, including a supervisor system, fleet management system, and/or warehouse management system (collectively "Supervisor 200"). In various embodiments, supervisor 200 could be configured to perform, for example, fleet management and monitoring for a plurality of vehicles (e.g., AMRs) and, optionally, other assets within the environment. Supervisor 200 can be local or remote to the environment, or some combination thereof.

In various embodiments, supervisor 200 can be configured to provide instructions and data to AMR 100, and to monitor the navigation and activity of the AMR and, optionally, other AMRs. The AMR can include a communication module 160 configured to enable communications with the supervisor 200 and/or any other external systems. The communication module 160 can include hardware, software, firmware, receivers, and transmitters that enable communication with supervisor 200 and any other external systems over any now known or hereafter developed communication technology, such as various types of wireless technology including, but not limited to, Wi-Fi, Bluetooth, cellular, global positioning system (GPS), radio frequency (RF), and so on.

As an example, supervisor 200 could wirelessly communicate a path for the robotic vehicle 100 to navigate for the vehicle to perform a task or series of tasks. The path can be relative to a map of the environment stored in memory and, optionally, updated from time-to-time, e.g., in real-time, from vehicle sensor data collected in real-time as AMR 100 navigates and/or performs its tasks. The sensor data can include sensor data from sensors 150. As an example, in a warehouse setting the path could include a plurality of stops along a route for the picking and loading and/or the dropping and unloading of goods. The path can include a plurality of path segments. The navigation from one stop to another can comprise one or more path segments. Supervisor 200 can also monitor the AMR 100, such as to determine robotic vehicle's location within an environment, battery status and/or fuel level, and/or other operating, vehicle, performance, and/or load parameters.

As is shown in FIG. 2, in example embodiments, AMR 100 includes various functional elements, e.g., components and/or modules, which can be housed within housing 115. Such functional elements can include at least one processor 10 coupled to at least one memory 12 to cooperatively operate the vehicle and execute its functions or tasks. Memory 12 can include computer program instructions, e.g., in the form of a computer program product, executable by the processor 10. Memory 12 can also store various types of data and information. Such data and information can include route data, path data, path segment data, pick data, location data, environmental data, and/or sensor data, as examples, as well as the electronic map of the environment.

In this embodiment, processor 10 and memory 12 are shown onboard the robotic vehicle of FIG. 1, but external (offboard) processors, memory, and/or computer program code could additionally or alternatively be provided. That is, in various embodiments, the processing and computer storage capabilities can be onboard, offboard, or some combination thereof. For example, some processor and/or memory functions could be distributed across the supervisor 200, other vehicles, and/or other systems external to the robotic vehicle.

The functional elements of AMR 100 can further include a navigation module 170 configured to access environmental data, such as the electronic map, and path information stored in memory 12, as examples. Navigation module 170 can communicate instructions to a drive control subsystem 120 to cause AMR 100 to navigate its path within the environment. During vehicle travel, navigation module 170 may receive information from one or more sensors 150, via a sensor interface (I/F) 140, to control and adjust the navigation of the robotic vehicle. For example, the sensors 150 may provide sensor data to navigation module 170 and/or the drive control subsystem 120 in response to sensed objects and/or conditions in the environment to control and/or alter the robotic vehicle's navigation. As examples, the sensors 150 can be configured to collect sensor data related to objects, obstructions, equipment, goods to be picked, hazards, completion of a task, and/or presence of humans and/or other robotic vehicles.

A safety module 130 can also make use of sensor data from one or more of sensors 150, including LiDAR scanners 154, to interrupt and/or take over control of drive control subsystem 120 in accordance with applicable safety standard and practices, such as those recommended or dictated by the United States Occupational Safety and Health Administration (OSHA) for certain safety ratings. For example, if safety sensors detect objects in the path as a safety hazard, such sensor data can be used to cause drive control subsystem 120 to stop the vehicle to avoid the hazard.

Sensors 150 can include one or more stereo cameras 152 and/or other volumetric sensors, sonar sensors, and/or LiDAR scanners or sensors 154, as examples. Inventive concepts are not limited to particular types of sensors. In various embodiments, sensor data from one or more of sensors 150, e.g., one or more stereo cameras 152 and/or LiDAR scanners 154, can be used to generate and/or update a 2-dimensional or 3-dimensional model or map of the environment, and sensor data from one or more of sensors 150 can be used for the determining location of the AMR 100 within the environment relative to the electronic map of the environment.

The robotic vehicle may also include a human user interface module 205 configured to receive human operator inputs, e.g., a pick or drop complete input at a stop on the path. Other human inputs could also be accommodated, such as inputting map, path, and/or configuration information.

FIG. 2 also shows an embodiment of an access control system configured to monitor the states of a plurality of entities, e.g., locations, within the environment and to communicate the state of such entities to supervisor 200. The access control system can comprise an access control module 190, a plurality of industrial controllers, here in the form of or including PLCs, 210, and a plurality of detectors 220 configured to sense or otherwise detect availability of their associated entities. The detectors 220 can be or include presence detectors. In various embodiments, the detectors 220, or presence detectors, can comprise one or more cameras, LiDARs, pressure sensors, vibration sensors, motion detectors, and/or combinations thereof, as examples. Supervisor 200 with access control and fleet management functionality can be referred to as a management system or asset management system within, for example, a warehouse environment.

In various embodiments, access control module 190 can form part of supervisor 200, which can also include fleet management functionality. For ease of discussion, it is assumed that supervisor 200 includes such fleet management functionality. However, it will be understood that in other embodiments, fleet management functionality can be provided in a different system, a fleet management system (FMS), that is in communication with supervisor 200. It will also be understood that access control module 190 can be part of a standalone system that communicates with an FMS and/or supervisor 200. In various embodiments, supervisor 200 can comprise at least one processor and computer memory executing access control program code and fleet management program code to perform their respective functions.

In various embodiments, access control module 190 can comprise at least one application programming interface (API) 192 that enables communication with a plurality of PLCs arranged to monitor a plurality of entities in the form of or including locations. Access control module 190 is configured to receive signals, via API 192, from a plurality of PLCs 210 indicating the availability or unavailability of various locations. Each PLC is configured to receive signals from least one detector 220 arranged to monitor availability of at least one location. Access control module 190 can indicate to supervisor 200 whether or not a location is available for use by an AMR. Supervisor 200 can grant or deny access to a location to at least one AMR based on the indication from access control module 190 that the location is either available or unavailable, where only one AMR is granted access to, or ownership of, a location at a time.

Supervisor 200 can maintain ownership of a location by an AMR until the access control module indicates that the owning AMR has vacated or otherwise released the location, e.g., when the AMR has completed its task at the location. At such time, the vacancy and, therefore, availability, is indicated by the detector(s) 220 associated with the PLC(s) 210 monitoring the location and access control module 190 signals the state change to supervisor 200, which releases the location to make it available for assignment to another AMR by supervisor 200.

Supervisor 200 and access control module 190 can collaborate to monitor availability of locations, manage requests for exclusive ownership of a location among the set of candidate locations, and selectively assign exclusive ownership of a location to an AMR based on availability of the location indicated by the associated PLC. Access control module 190 can be configured to continually monitor and store the states of the locations received from the PLCs, and such availability states can be used by supervisor to grant or deny access to the locations based on the stored state of the locations.

In some embodiments, the systems and methods for utilizing location control to manage at least one AMR in a changing facility while performing work therein incorporate one or more of the following computer-implemented functions and/or supports the following workflow:

a. An industrial controller writes a signal to the system, which can form part of a supervisor/FMS, that candidate locations have been preconfigured to start work;
b. An AMR starts executing work and navigating;
c. An industrial controller (e.g., a PLC) determines the state of a location is unoccupied/available, that is, whether a detector detects material in the location as indicated by the PLC, and writes data to the system indicating that a location is unoccupied/available;
d. An industrial controller (e.g., a PLC) writes data to the system that a different location is occupied;
e. The AMR requests exclusive access to some location, from a set of preconfigured locations, which are the locations from steps c and d;
f. The system determines an occupancy state of the location based on the indication by the PLC as to whether the location is unoccupied/available and the availability of the location to be assigned, that is, whether another AMR has already been assigned to operate in the location. If the PLC indicated that the location is unoccupied/available and the system determines that the location is available to be assigned, the AMR is granted temporary, exclusive ownership of the unoccupied and currently unowned location, as a result, the AMR takes ownership of the location;
g. The AMR navigates to the unoccupied location;
h. The AMR arrives at the unoccupied location and performs its work function;
i. The AMR leaves the location;
j. The industrial controller (e.g., a PLC) detects the change in state of the location and communicates the state change to the system; and
k. The system releases ownership of location, making the location available to other AMRs.

In this context, "ownership" means the AMR has been granted exclusive rights to an entity, e.g., a location or space, equipment, apparatus, or other resource to be used by an AMR in performing a workflow task. The entity will be considered unavailable for the purposes of other AMRs until released by the owning AMR. Ownership is released after the successful completion of the action by the AMR at that location or unsuccessful completion of the action by the AMR or other fault as indicated by the AMR.

When selecting a location among a group of locations to assign an AMR and to send the AMR, the system evaluates two conditions, which both must be true. The first condition is whether the occupancy state of the location is in the required state for the AMRs action. For example, if the step specifies a pick to be performed, the system determines whether the PLC indicates that the location unoccupied. The second condition is whether the location is currently not owned/assigned to another AMR, that is, whether the location is available for assignment. The PLC controls the first condition and the system controls the second condition.

According to aspects of the inventive concepts, access control module 190, which can form part of a supervisor system incorporating fleet management functionality does not need to periodically poll numerous industrial controllers, e.g., PLCs, at a high frequency. The industrial controllers inform the supervisor of location-based state changes, allowing for much more efficient resource and network utilization. In the present embodiment, this approach generalizes a PLC message delivered over a Modbus into meaningful business logic. The access control module, through communication with the PLCs, informs the supervisor of the states of entities, e.g., locations, in real time or near real time, which allows AMRs to safely and efficiently perform work by not contending for the same location, e.g., location or space, apparatus, equipment, or other resource, at the same time during workflow operations. In accordance with aspects of the inventive concepts, the environment is no longer described in terms of the periodic states of its industrial controllers, but rather in terms of the real time states of locations (or other entities). The ever-changing state of an environment, e.g., a facility, and its locations is updated in real time to allow AMRs exclusive ownership of an entity (e.g., location or space, equipment, or other resource) to perform work just-in-time.

In some embodiments, each entity (location or space, equipment, or other resource) is monitored by at least one industrial controller in the form of PLC 210. In some embodiments, PLC 210 is coupled to at least one detector or sensor is configured to write information about what it is being sensed relative to locations to the access control module of the supervisor in order to allow a set of AMRs to safely accomplish meaningful work based on the state of a set of the location indicated by the PLCs. For sensing, the industrial controller 210 can include or be coupled to at least one detector 220 arranged to monitor the occupancy/availability of an entity (space, location, or resource). For example, a presence detector 220 can be arranged to monitor occupancy of at least one location, where a presence of an AMR indicates occupancy and unavailability.

In various embodiments, the access control module of supervisor 200 is configured with or includes a non-blocking Modbus server. This Modbus server can run on a configurable port (e.g., port 502 by default) and is what a PLC uses to communicate information to the access control module 190 of supervisor 200. In various embodiments, the server is setup with a heartbeat, such that a PLC can determine if there is a network disconnect. At a configurable interval (e.g., 5000 ms by default), a configurable coil address (e.g., 0 by default) and a configurable register address (e.g., 1 by default) can be updated. The coil address can be a Boolean value that is updated (true→false→true, etc.) and the register address is an integer value that is updated (0→1→0, etc.). The PLCs can make read requests to those addresses, verifying that the values change, in order to make sure there is a valid network connection to the server. Before a PLC can be used, it needs to be registered with the system. When registering a PLC with the system via a RESTful POST request, the PLC needs to be given a name, address, and data-type. The name can be any human readable string and is what is used to abstract the state of a PLC to business logic. The address is the Modbus address of a PLC. The data-type can be either bool or bytes, which is set based on the type of value that the PLC is writing, either a bool (coil) or bytes (register).

Once an industrial controller alias has been created, it can be used to trigger new work to start or be used to finish already started work. When a PLC writes a Boolean/byte value to the server, the system takes that value and translates it into the state of an alias. In some embodiments, if a False/0 is written to the pre-configured Modbus address, the state of that alias is considered to be False. In some embodiments, if a True/1 is written to the pre-configured Modbus address, the state of that alias is considered to be True. In some embodiments, if the alias is used to start new work, a value of True starts the work. If the alias is used to finish work later in the future, a value of True means that there is something at that location.

If a PLC is monitoring a single space, location, or resource, then Boolean values can be used, e.g., 1 and 0. If a PLC monitors multiple spaces, locations, or resources using multiple presence detectors, then the PLC could write a byte or other code that indicates a particular space, location, or resource and its occupancy/availability to the fleet management system.

In various embodiments, the Modbus server, which can form part of the supervisor, can be configured with a non-blocking gRPC server listening on port 50053. The gRPC server is the query mechanism for the state of the configured aliases. This query mechanism is what enables generalized abstraction between the state of a PLC and doing meaningful work. When using a set of PLCs to finish work, an AMR, via Fleet Central (or FMS) program/system, is able to ask for information about where to go, in a just-in-time manner. Given the ever-changing nature of a facility, there is no way to know a priori where work can and should be performed at a particular time. Once an AMR is granted permission to an entity (e.g., a location), the supervisor maintains ownership of that entity with the AMR such that a different AMR will not be granted permission to that same entity at the same time. When an AMR is done with its exclusive ownership of the entity (e.g., location), the system will revoke ownership of that entity (e.g., location) to that AMR, thereby allowing other AMRs to request access to the entity (e.g., location). In other words, the supervisor will release the entity and make it available for another AMR. In various embodiments, if the AMR that has exclusive ownership of an entity encounters an error that does not allow it to finish work associated with the entity, the supervisor may be configured to revoke ownership of the entity to the AMR and allow the entity to be used by a different AMR.

Figure 3:
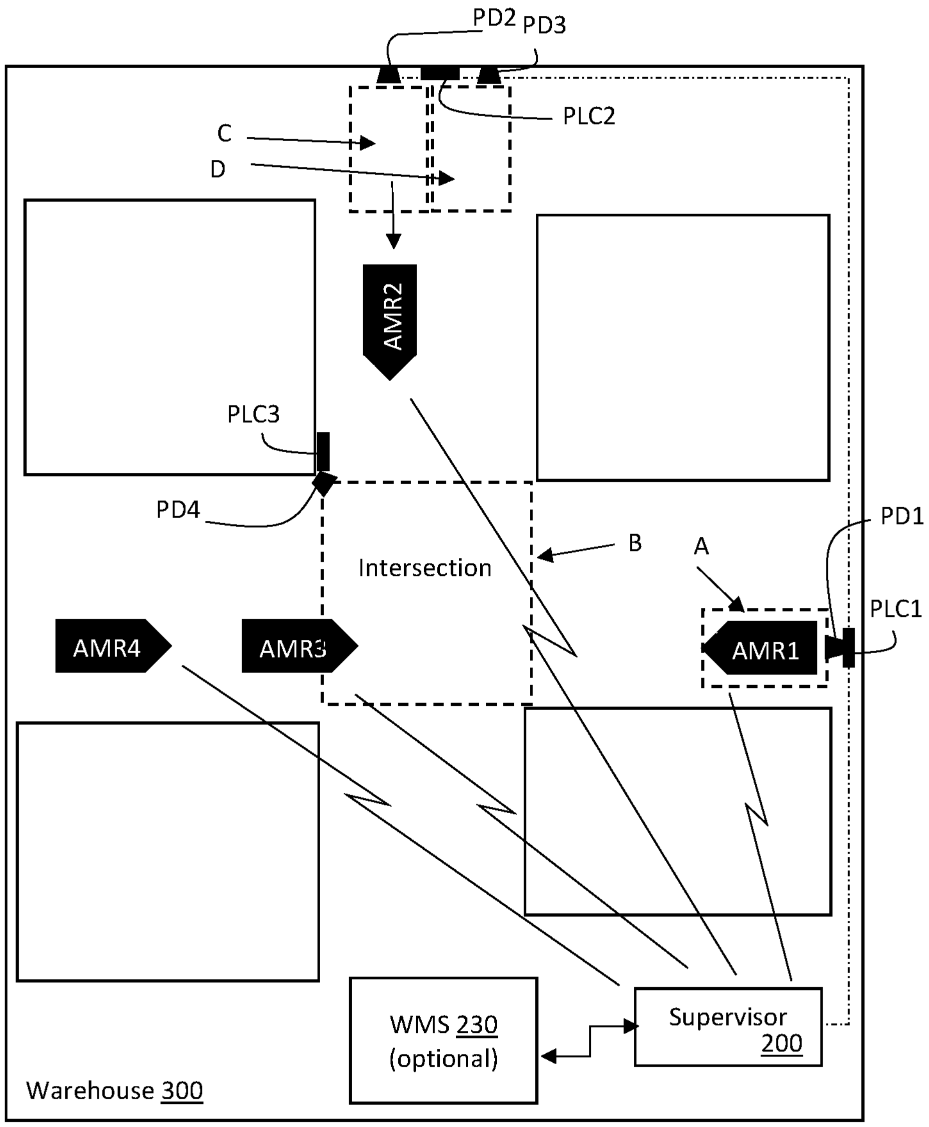
FIG. 3 illustrates an example of warehouse environment with a plurality of AMRs in communication with a fleet management system, in accordance with aspects of inventive concepts.

FIG. 3 illustrates an example of an environment in the form of a warehouse 300 with a plurality of AMRs in communication with a supervisor system, for example supervisor 200, in accordance with aspects of inventive concepts. The supervisor may be in communication with or form part of a warehouse management system (WMS) 230. In some embodiments, a warehouse management system may be characterized as a system that monitors and manages all assets within a facility, e.g., inventory, AMRs, order selectors, and so forth. In some embodiments, the supervisor may be characterized as a system that manages and monitors the AMR fleet.

In FIG. 3 a plurality of AMRs (e.g., AMRs AMR1, AMR2, AMR3 and AMR4) autonomously navigate through warehouse 300. Various entities (e.g., locations A, B, C and D) within the environment include assignable locations. Each assignable location (A, B, C and D) may be monitored by a presence detector coupled to a PLC. PLC1 is coupled to or in communication with presence detector PD1, PLC2 is coupled to or in communication with presence detectors PD2 and PD3, and PLC3 is coupled to or in communication with presence detector PD4. A PLC may be coupled to or in communication with one presence detector, for example, PLC1 and PLC3, or to multiple detectors, for example PLC2. AMR1 is shown occupying an assignable location A and AMR2 is shown leaving an assignable location C. The state of the location recently vacated by AMR2 will be sensed by the corresponding presence detector PD2 and communicated to PLC2. PLC2 will communicate the state change to the FMS, from occupied to unoccupied.

An intersection is shown as an assignable location B, which is monitored by PLC3/PD4. Location B having been unoccupied, is indicated by PLC3 as unoccupied to supervisor 200. AMR3 requests access from supervisor 200 to Location B, the supervisor 200 determines that the PLC has indicated that Location B is unoccupied and that Location B is available, that is, unassigned to another AMR, and AMR3 is granted access (and ownership) of intersection B by supervisor 200. Once AMR3 has been assigned exclusive, temporary ownership of or access to the intersection, AMR3 can enter intersection B. When presence detector PD4 detects the presence of AMR3 in intersection B, PLC3 will communicate the state to supervisor 200, which changed from unoccupied to occupied. During this time, AMR2 and AMR4 will be denied access to intersection B, since it has been assigned to AMR3. Once AMR3 exits the intersection, the change in state will be detected by the presence detector PD4 and communicated by PLC3 to the supervisor 200 and the supervisor 200 releases the temporary, exclusive access of intersection B. The supervisor 200 may then temporarily assign the intersection to AMR2 or AMR4.

Figure 4:
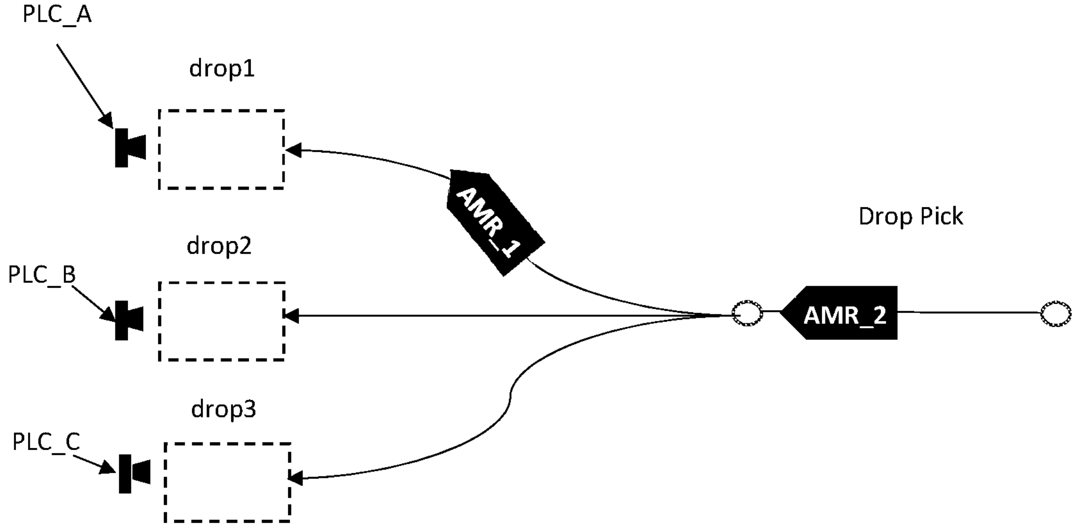
FIG. 4 illustrates an example of an interaction between first and second AMRs under the control of independent controllers and a fleet management system, in accordance with aspects of inventive concepts.

FIG. 4 illustrates an example of an interaction between first and second AMRs under the control of supervisor 200 (and access control module 190), in accordance with aspects of inventive concepts.

In FIG. 4, PLC_A at a first location has been registered with an alias of drop1, independent controller PLC_B at a second location has been registered with an alias of drop2, and independent controller PLC_C at a third location has been registered with an alias of drop3. Each of PLC_A, PLC_B and PLC_C is coupled to at least one presence detector for monitoring the presence or absence of an AMR.

In FIG. 4, a dock pick is performed by AMR_1 and AMR_2. AMR_1 requests access from the supervisor to a location group including material locations drop1, drop2, and drop3. In FIG. 4, AMR_1 has requested and been granted temporary ownership to unoccupied and unowned location drop1 by the supervisor. AMR_1 is proceeding to drop1. Because AMR_1 has been granted temporary ownership of drop1, upon AMR_2 requesting access to a location group including material locations drop1, drop2 and drop3, AMR_2 will not be given access to drop1. Rather, AMR_2 will only be permitted by the supervisor to have access to drop2 or drop3, while AMR_1 has been granted temporary ownership of drop1. AMR_2 may request temporary ownership from the supervisor to either drop2 or drop3. Alternatively, AMR_2 may wait until PLC_A and access control module 190 communicates to supervisor 200 a change of state from occupied to unoccupied, at which point, the supervisor may grant AMR_2 access to drop1.

In some embodiments, a Modbus server is not used, rather the industrial controllers (or PLCs) acting as individual devices that the supervisor reads from in real or near real time.

When there are numerous available locations/resources for an AMR to use when finishing already started work, there are different approaches to choosing which one of those resources to assign to an AMR. The particular way in which a location is chosen for assignment to an AMR can be independent of the system and method herein.

Figure 5:
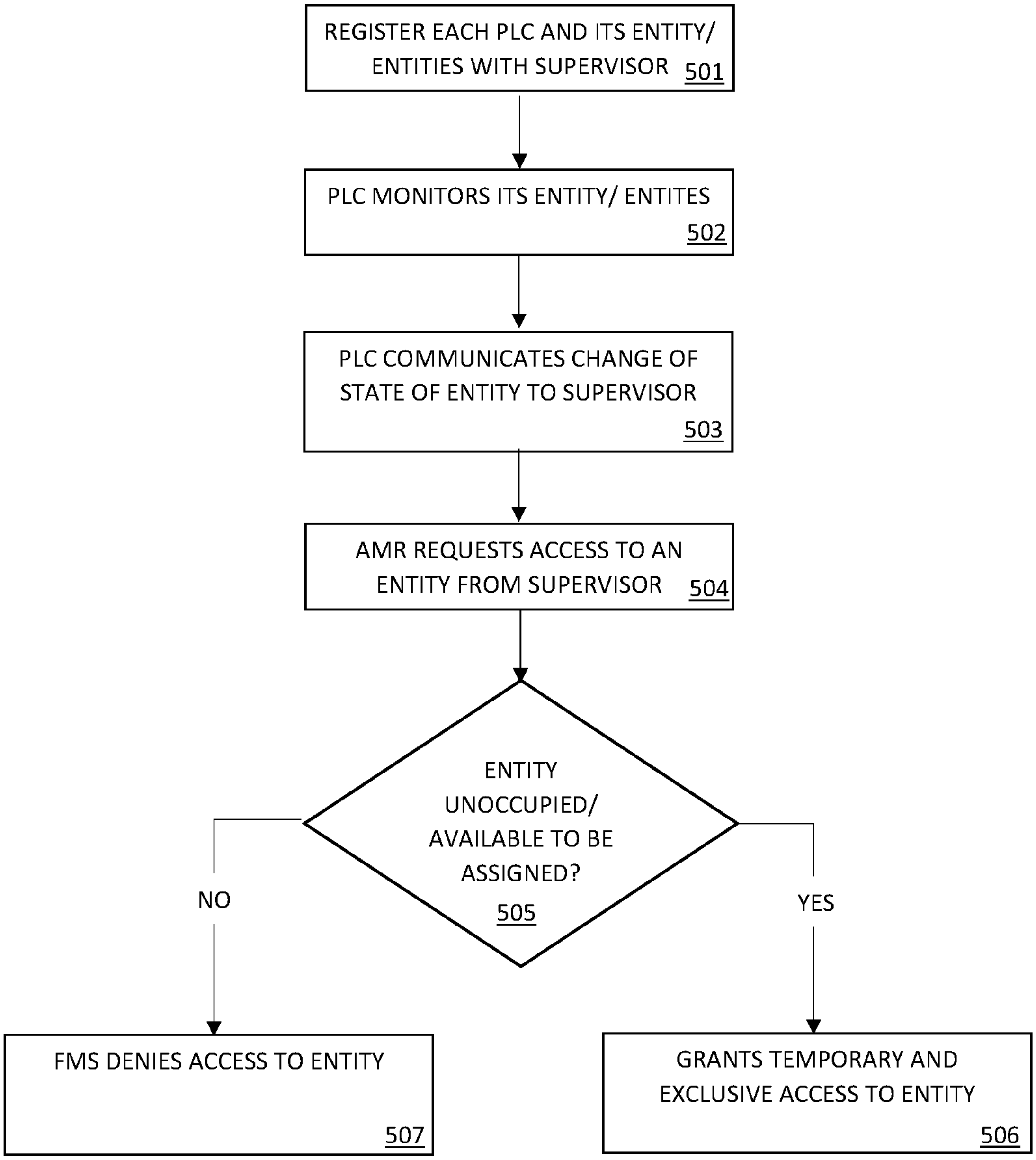
FIG. 5 is an embodiment of a method of providing an AMR access to a location in a facility, in accordance with aspects of the inventive concepts.

FIG. 5 is an embodiment of a method 500 of providing an AMR access to a location in a facility, in accordance with aspects of the inventive concepts.

In FIG. 5, in step 501, a PLC is registered with access control module 190 of supervisor 200. In step 502, the PLC monitors at least one entity (e.g., location or space, equipment, or other resource) for a change of state. That is, the PLC monitors, using at least one presence detector, whether the entity is available/occupied or unavailable/unoccupied by an AMR, e.g., whether a monitored location is occupied by an AMR or available for access by an AMR. In step 503, the PLC communicates a change of state, that is, a change in the occupancy/availability, of the entity to access control module 190. The state of the entity is stored for use by the supervisor. In step 504, an AMR requests access to an entity from the supervisor. In step 505, the supervisor determines if the entity is unoccupied/available based on the state of the entity indicated by the access control module and PLC and determines whether the location is available to be assigned, that is, whether or not another AMR has already been assigned to operate in the location. If the entity is both unoccupied/available and available to be assigned, the supervisor grants the AMR access to the entity, in step 506. If the entity is either occupied/unavailable or unavailable to be assigned, the supervisor denies the AMR access to the entity, in step 507. In some embodiments, the supervisor may then grant the AMR access to another unoccupied/available entity, if available, or the supervisor may wait to grant the AMR access to the entity when the PLC communicates to the access control module that the entity has changed state from occupied to unoccupied and/or the system communicates that the entity has changed from unavailable to be assigned to available to be assigned.

Figure 6:
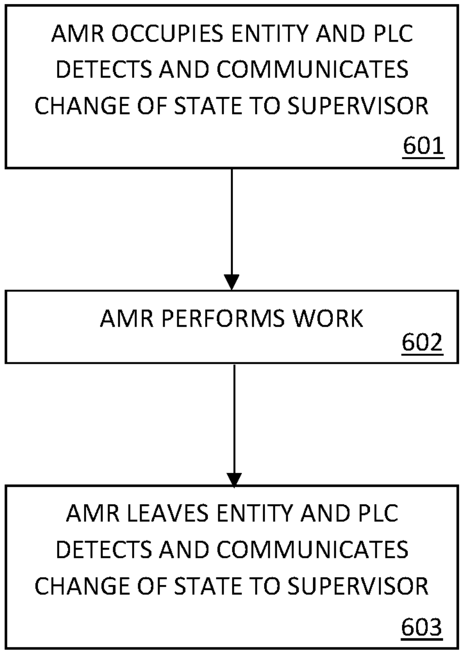
FIG. 6 is an embodiment of a method of monitoring an entity in an environment, in accordance with aspects of the inventive concepts.

FIG. 6 is an embodiment of a method 600 of monitoring an entity within an environment, such as a location within a facility, in accordance with aspects of the inventive concepts. If an AMR has been granted access to an entity by the supervisor, the AMR may travel to the entity and occupy the entity, in step 601. In step 601, as the AMR occupies the entity the PLC and its detector(s) detects a change of state and communicates the change of state to the access control module of the supervisor, which registers the current state of occupied/unavailable. In step 602, the AMR performs work utilizing the entity for which the AMR has been granted ownership, such as occupying a location for a drop or pick operation. In step 603, the AMR leaves the entity, as it would do upon task completion. In step 603, when the PLC and its detector(s) detects a change of the state of the entity, the PLC communicates the change of state to the supervisor.

The system and method described herein may be used in any field that uses the state of industrial controllers (or PLCs) to maintain exclusive ownership of a resource or location among autonomous entities.

While the foregoing has described what are considered to be the best mode and/or other preferred embodiments, it is understood that various modifications can be made therein and that aspects of the inventive concepts herein may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provide in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can combined in any given way.

Below follows an itemized list of statements describing embodiments in accordance with the inventive concepts:

1. A system, comprising:
   a plurality of industrial controllers each coupled to at least one presence detector configured to detect a state of availability of an entity from a plurality of entities; and
   a management system configured to register a state of availability of each entity in an environment and to selectively grant temporary, exclusive access of an entity to an autonomous mobile robot (AMR) based on the state of availability of the entity.
2. The system of statement 1, or any other statement or combination of statements, wherein an industrial controller is configured to communicate a state of availability of monitored entity to the management system in response to a change in state of the monitored entity.
3. The system of statement 1, or any other statement or combination of statements, wherein the entity comprises a space, a location, equipment, and/or a resource.
4. The system of statement 1, or any other statement or combination of statements, wherein the management system is further configured to deny access by other AMRs to the entity, when an industrial controller registered in association with the entity communicates to the management system that the entity is occupied.
5. The system of statement 1, or any other statement or combination of statements, wherein, when the AMR completes use of the entity, an industrial controller registered in association with the entity is configured to send a change of state message to the management system indicating that the entity is unoccupied and the management system releases the temporary, exclusive access of the AMR.
6. The system of statement 1, or any other statement or combination of statements, further comprising a plurality of industrial controllers and a plurality of entities, each industrial controller in communication with at least one detector configured to monitor at least one uniquely identified entity.
7. The system of statement 1, or any other statement or combination of statements, wherein an industrial controller is in communication with a plurality of detectors configured to monitor a plurality of uniquely identified entities and the industrial controller is configured to register a state of each uniquely identified entity individually.

8. The system of statement 1, or any other statement or combination of statements, wherein the plurality of industrial controllers coupled to and/or in communication with the at least one presence detector is configured to detect and register the state of availability of the at least one entity in real time.
9. The system of statement 1, or any other statement or combination of statements, wherein the plurality of industrial controllers includes a plurality of program logic controllers (PLCs).
10. The system of statement 1, or any other statement or combination of statements, wherein the industrial controllers include program logic controllers (PLCs), the entities include locations, the environment is a warehouse, the AMRs include material transport AMRs, and the management system includes access control functionality in communication with the PLC, and fleet management functionality in communication with the AMRs.
11. A method, comprising:
using a plurality of industrial controllers each coupled to at least one presence detector, detecting a state of availability of an entity from a plurality of entities; and
registering a state of availability of each entity of an environment in a management system and selectively granting temporary, exclusive access of an entity to an autonomous mobile robot (AMR) based on the state of availability of the entity.
12. The method of statement 11, or any other statement or combination of statements, further comprising the industrial controller communicating a state of availability of monitored entity to the management system in response to a change in state of the monitored entity.
13. The method of statement 11, or any other statement or combination of statements, wherein the entity comprises a space, a location, equipment, and/or a resource.
14. The method of statement 11, or any other statement or combination of statements, further comprising the management system denying access by other AMRs to the entity, when an industrial controller registered in association with the entity communicates to the management system that the entity is occupied.
15. The method of statement 11, or any other statement or combination of statements, further comprising, when the AMR completes use of the entity, an industrial controller registered in association with the entity sending a change of state message to the management system indicating that the entity is unoccupied and the management system releasing the temporary, exclusive access of the AMR.
16. The method of statement 11, or any other statement or combination of statements, further comprising a plurality of industrial controllers and a plurality of entities, each industrial controller in communication with at least one detector monitoring at least one uniquely identified entity.
17. The method of statement 11, or any other statement or combination of statements, further comprising an industrial controller in communication with a plurality of detectors monitoring a plurality of uniquely identified entities and the industrial controller registering a state of each uniquely identified entity individually.
18. The method of statement 11, or any other statement or combination of statements, further comprising the plurality of industrial controllers coupled to and/or in communication with the at least one presence detector detecting and registering the state of availability of the at least one entity in real time.
19. The method of statement 11, or any other statement or combination of statements, wherein the plurality of industrial controllers includes a plurality of program logic controllers (PLCs).
20. The method of statement 11, or any other statement or combination of statements, wherein the industrial controllers include program logic controllers (PLCs), the entities include locations, the environment is a warehouse, the AMRs include material transport AMRs, and the management system includes access control functionality in communication with the PLC, and fleet management functionality in communication with the AMRs.
21 A system, comprising:
for each of a plurality of entities within an environment, an industrial controller in combination with at least one presence detector configured to determine a state of availability of an entity and to communicate the state of availability of the entity to a management system; and
the management system is configured to register the state of each entity and to selectively grant or deny temporary, exclusive access of a requested entity to an autonomous mobile robot (AMR) based on a state of the requested entity.
22. The system of statement 21, or any other statement or combination of statements, wherein the environment is a warehouse environment and the plurality of entities includes a location, a space, equipment, or other resource usable and requestable by the plurality of AMRs to perform a task.
23. The system of statement 21, or any other statement or combination of statements, wherein at least one industrial controller is coupled to only one presence detector.
24. The system of statement 21, or any other statement or combination of statements, wherein at least one industrial controller is coupled to a plurality of presence detectors.
25. The system of statement 21, or any other statement or combination of statements, wherein each industrial controller is configured to send a change of state message to the management system in real-time in response to an AMR commencing user or completing use of an entity.
26 A method, comprising:
for each of a plurality of entities within an environment, an industrial controller in combination with at least one presence detector determining a state of availability of an entity and communicating the state of availability of the entity to a management system; and
the management system registering the state of each entity and selectively granting or denying temporary, exclusive access of a requested entity to an autonomous mobile robot (AMR) based on a state of the requested entity.
27. The method of statement 26, or any other statement or combination of statements, wherein the environment is a warehouse environment and the plurality of entities includes a location, a space, equipment, or other resource usable and requestable by the plurality of AMRs to perform a task.
28. The method of statement 26, or any other statement or combination of statements, wherein at least one industrial controller is coupled to only one presence detector.

29. The method of statement 26, or any other statement or combination of statements, wherein at least one industrial controller is coupled to a plurality of presence detectors.

30. The method of statement 26, or any other statement or combination of statements, further comprising each industrial controller sending a change of state message to the management system in real-time in response to an AMR commencing user or completing use of an entity.

What is claimed is:

1. A system, comprising:

a plurality of industrial controllers each coupled to at least one presence detector configured to detect a state of availability of an entity from a plurality of entities; and a management system configured to register a state of availability of each entity in an environment and to selectively grant temporary, exclusive access of an entity to an autonomous mobile robot (AMR) based on the state of availability of the entity, wherein the entity comprises a space, a location, equipment, and/or a resource, and wherein the plurality of industrial controllers includes a plurality of program logic controllers (PLCs).

2. The system of claim 1, wherein an industrial controller is configured to communicate a state of availability of monitored entity to the management system in response to a change in state of the monitored entity.

3. The system of claim 1, wherein the management system is further configured to deny access by other AMRs to the entity, when an industrial controller registered in association with the entity communicates to the management system that the entity is occupied and/or unavailable.

4. The system of claim 1, wherein, when the AMR completes use of the entity, an industrial controller registered in association with the entity is configured to send a change of state message to the management system indicating that the entity is available and/or unoccupied and releases the temporary, exclusive access of the AMR.

5. The system of claim 1, further comprising a plurality of industrial controllers and a plurality of entities, each industrial controller in communication with at least one detector configured to monitor at least one uniquely identified entity.

6. The system of claim 1, wherein an industrial controller is in communication with a plurality of detectors configured to monitor a plurality of uniquely identified entities and the industrial controller is configured to register a state of each uniquely identified entity individually.

7. The system of claim 1, wherein the plurality of industrial controllers coupled to and/or in communication with the at least one presence detector are configured to detect and register the state of availability of the at least one entity in real time.

8. The system of claim 1, wherein the industrial controllers include program logic controllers (PLCs), the entities include locations, the environment is a warehouse, the AMRs include material transport AMRs, and the management system includes access control functionality in communication with the PLC, and fleet management functionality in communication with the AMRs.

9. A method, comprising:

using a plurality of industrial controllers each coupled to at least one presence detector, detecting a state of availability of an entity from a plurality of entities; and registering a state of availability of each entity of an environment in a management system and selectively granting temporary, exclusive access of an entity to an autonomous mobile robot (AMR) based on the state of availability of the entity, wherein the entity comprises a space, a location, equipment, and/or a resource, and wherein the plurality of industrial controllers includes a plurality of program logic controllers (PLCs).

10. The method of claim 9, further comprising the industrial controller communicating a state of availability of monitored entity to the management system in response to a change in state of the monitored entity.

11. The method of claim 9, further comprising the management system denying access by other AMRs to the entity, when an industrial controller registered in association with the entity communicates to the management system that the entity is occupied and/or unavailable.

12. The method of claim 9, further comprising, when the AMR completes use of the entity, an industrial controller registered in association with the entity sending a change of state message to the management system indicating that the entity is available and/or unoccupied and releasing the temporary, exclusive access of the AMR.

13. The method of claim 9, further comprising a plurality of industrial controllers and a plurality of entities, each industrial controller in communication with at least one detector monitoring at least one uniquely identified entity.

14. The method of claim 9, further comprising an industrial controller in communication with a plurality of detectors monitoring a plurality of uniquely identified entities and the industrial controller registering a state of each uniquely identified entity individually.

15. The method of claim 9, further comprising the plurality of industrial controllers coupled to and/or in communication with the at least one presence detector detecting and registering the state of availability of the at least one entity in real time.

16. The method of claim 9, wherein the industrial controllers include program logic controllers (PLCs), the entities include locations, the environment is a warehouse, the AMRs include material transport AMRs, and the management system includes access control functionality in communication with the PLC, and fleet management functionality in communication with the AMRs.

17. A method, comprising:

for each of a plurality of entities within an environment, an industrial controller in combination with at least one presence detector determining a state of availability of an entity and communicating the state of availability of the entity to a management system; and the management system registering the state of each entity and selectively granting or denying temporary, exclusive access of a requested entity to an autonomous mobile robot (AMR) based on a state of the requested entity.

18. The method of claim 17, wherein the environment is a warehouse environment and the plurality of entities includes a location, a space, equipment, or other resource usable and requestable by the plurality of AMRs to perform a task.

19. The method of claim 17, wherein at least one industrial controller is coupled to only one presence detector.

20. The method of claim 17, wherein at least one industrial controller is coupled to a plurality of presence detectors.

21. The method of claim 17, further comprising each industrial controller sending a change of state message to the management system in real-time in response to an AMR commencing user or completing use of an entity.

* * * * *